United States Patent [19]

Horst et al.

[11] 4,023,010
[45] May 10, 1977

[54] OPTICAL IDENTIFICATION SYSTEM AND READER FOR READING OPTICAL GRATINGS ON A RECORD MEDIUM

[75] Inventors: William R. Horst, Dayton; Charles F. Mort, Xenia; William J. Hale, Kettering, all of Ohio

[73] Assignee: NCR Corporation, Dayton, Ohio

[22] Filed: Sept. 8, 1975

[21] Appl. No.: 611,378

[52] U.S. Cl. ................ 235/61.11 E; 340/146.3 P; 340/173 LM; 350/162 R; 356/99
[51] Int. Cl.[2] ................ G06K 7/14; G06K 19/06; G11C 11/44; G02B 5/18
[58] Field of Search ............ 340/173 LM, 146.3 P; 350/162 SF, 3.5, 162 R; 179/100.3 L; 235/61.7 B, 61.11 E, 61.12 R, 61.12 N; 250/550, 566, 568, 569; 356/99

[56] References Cited

UNITED STATES PATENTS

| | | | |
|---|---|---|---|
| 1,897,219 | 2/1933 | Schroter | 235/61.11 E |
| 3,312,955 | 4/1967 | Lamberts | 340/173 LM |
| 3,437,824 | 4/1969 | Lohmann | 340/146.3 P |
| 3,523,734 | 8/1970 | Brehm | 350/162 R |
| 3,643,216 | 2/1972 | Greenaway | 340/146.3 P |
| 3,680,945 | 8/1972 | Sheridon | 350/162 R |
| 3,715,733 | 2/1973 | Feiner | 340/173 LM |
| 3,754,808 | 8/1973 | Clay | 350/3.5 |
| 3,814,904 | 6/1974 | Russell | 235/61.12 N |
| 3,838,401 | 9/1974 | Graf | 350/162 R |
| 3,894,756 | 7/1975 | Ward | 350/3.5 |

*Primary Examiner*—Robert M. Kilgore
*Attorney, Agent, or Firm*—J. T. Cavender; Albert L. Sessler, Jr.; Elmer Wargo

[57] ABSTRACT

An optical identification system including a reader for reading superimposed optical gratings on a record medium in which the reader has a grating plane and a radiant energy source for directing energy therefrom along an optical axis to the grating plane. Detectors are positioned in the reader to receive diffracted beams from the optical gratings on a record medium positioned at the grating plane. The reader also includes an optical imaging system having a concave lens for directing a zero order reflected beam which is displaced from the optical axis back to the grating plane to enable the resulting beams diffracted from the optical gratings to be received at the detectors whenever a record medium is displaced slightly from the grating plane.

14 Claims, 14 Drawing Figures

FEED DIRECTION

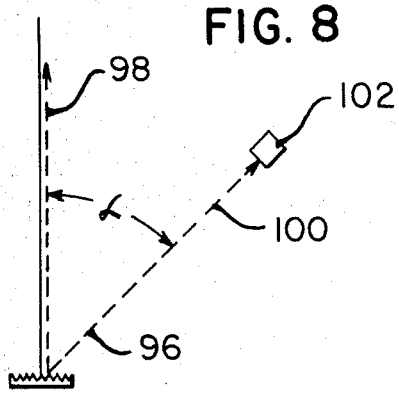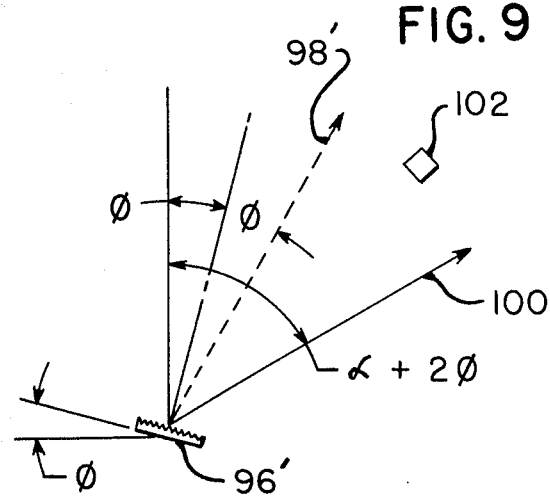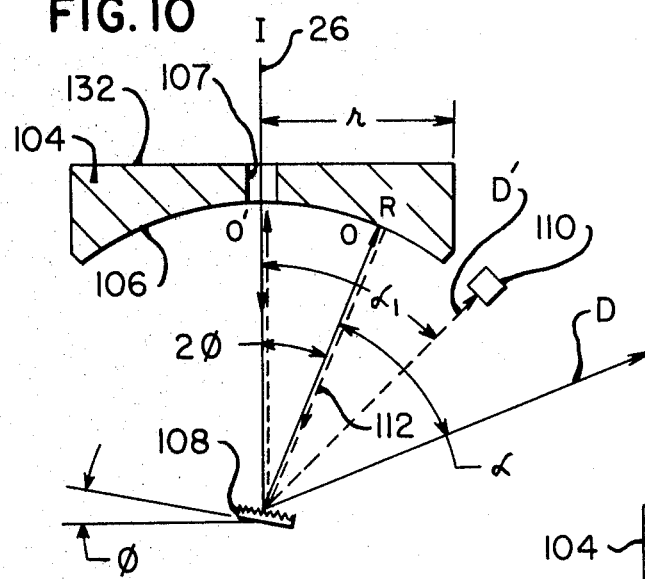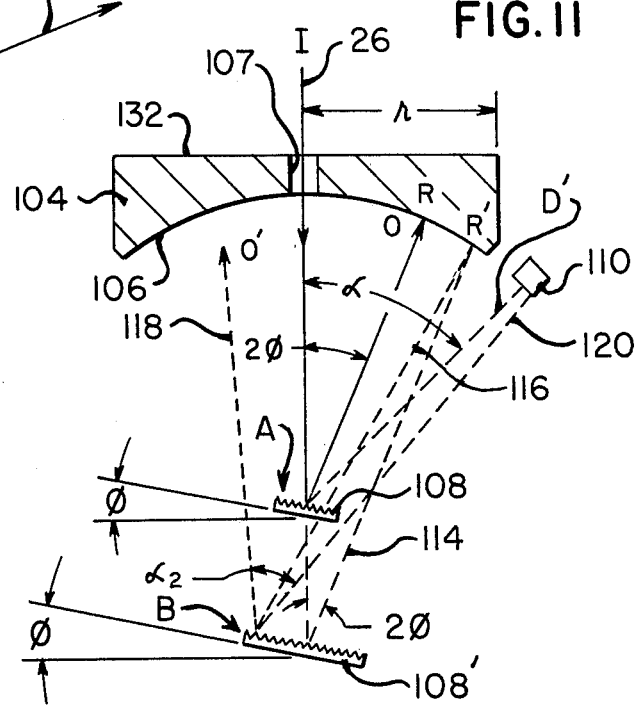

| CHARACTER DESIGNATIONS | DETECTOR POSITIONS ||||||
|---|---|---|---|---|---|---|
| | A | B | C | D | E | F |
| 0 | X | X | | | | |
| 1 | X | | X | | | |
| 2 | X | | | | | X |
| 3 | | X | X | | | |
| 4 | | X | | X | | |
| 5 | | X | | | X | |
| 6 | | X | | | | X |
| 7 | | | X | X | | |
| 8 | | | X | | X | |
| 9 | | | X | | | X |
| CONTROL | | | | X | X | |
| SPACE | | | | | X | X |
| GRATINGS: LINES PER MM | 350 | 350 | 600 | 600 | 600 | 600 |
| GRATING ANGULAR POSITION RELATIVE TO REFERENCE LINE "L" FIG. 2 | 90° | 0° | 112° 30' | 157° 30' | 22° 30' | 60° |

GRATING PATTERNS FOR EACH OF THE 12 CHARACTERS

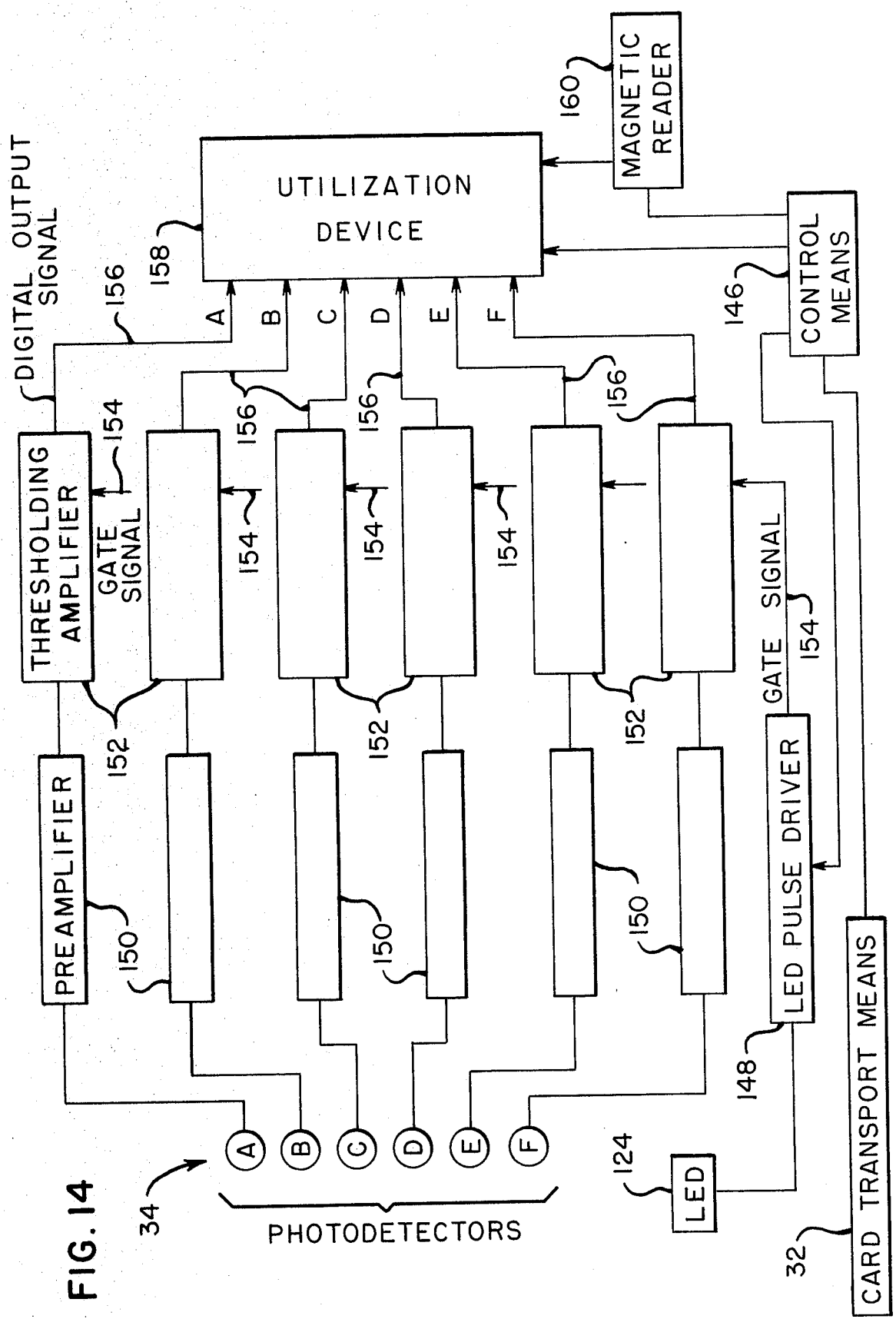

OPTICAL IDENTIFICATION SYSTEM AND READER FOR READING OPTICAL GRATINGS ON A RECORD MEDIUM

BACKGROUND OF THE INVENTION

This invention relates to an optical identification system including a reader for reading superimposed optical gratings located in a grating plane on a record medium, like a credit card, even though the optical gratings are slightly displaced from the grating plane while being read.

Recent developments in financial systems, credit systems, security systems, and funds transfer systems rely heavily on the use of record media or credit cards having magnetic strips or tracks thereon with various data like account number, credit limits, credit status, credit available for use, and the like being recorded magnetically on the stripes. Such systems have to be designed to avoid or minimize the fraudulent use of such credit cards.

One of the ways in which fraudulent use of such credit cards is made is to counterfeit the cards by mass reproduction techniques which skim or transfer the data magnetically recorded on a valid card to a fraudulent one.

The problem of trying to prevent the unauthorized duplication of or use of valid credit cards used in financial systems and the like is a very extensive one as evidenced by the variety of different techniques tried to avoid the problem and which are disclosed in the following U.S. Pat. Nos.:

3,604,901
3,620,590
3,759,179,
3,790,754,
3,831,008,
3,401,830,
3,644,716
3,808,404,
3,697,729,
3,691,527.

A copending application Ser. No. 588,937, filed on June 20, 1975 and assigned to the same assignee as this application discloses a system for checking on the validity of credit card used in financial systems and the like by using a credit card which has first data recorded thereon in the form of optical gratings and second data which is recorded in a magnetic stripe or track on the card. When the card is used in such a system, the first data is read by an optical grating reading means and the second data is read by a conventional magnetic track reader. The first and second data are then compared to determine the validity of the card being used in the system, and a validity signal is issued depending upon whether the card is valid or not. Because the first data is made up of optical gratings which are embedded in the credit card itself, the optical gratings are tamperproof and can not be easily skimmed or counterfeited as data which is magnetically recorded on a card can be. Thus a system is disclosed in said copending application which prevents the mass counterfeiting of valid credit cards. The subject matter of said copending application is incorporated by reference herein.

While the system disclosed in said copending application Ser. No. 588,937 works well, certain elements of the system could be improved upon with regard to the reader for reading the first data which is recorded on the credit card in the form of optical gratings. One of the problems with optical grating readers is that the optical gratings being read must lie in a grating plane if light which is diffracted from the optical gratings is to reach the associated photodetectors which are positioned in the reader with reference to the same grating plane. Accordingly, if a record medium or a credit card having the diffraction gratings thereon is slightly bowed, or if the card is moved through the reader so that the optical gratings thereon are located slightly out of the associated grating plane, it is possible that erroneous or missed readings will result.

Accordingly, the optical identification system of the present invention includes a reader which obviates the problems mentioned in the previous paragraph in that it can read the optical or diffraction gratings on a record medium or a credit card even though the optical gratings are positioned slightly outside of the associated grating plane during the reading process, thereby making the reader more reliable. The reader of the present invention also is capable of reading superimposed optical gratings which feature represents an improvement in the identification system disclosed in said copending application.

Some systems for recording and reading digital information using diffraction gratings are shown in the following U.S. Pat. Nos.:

3,312,955,
3,392,400,
3,523,734,
3,599,147,
3,635,545,
3,656,838, and
3,838,401.

While these patents show the use of diffraction gratings in systems for recording and reading information, the readers and systems shown herein employ structure which is quite different from that employed in this invention.

SUMMARY OF THE INVENTION

This invention relates to an optical identification system including a reader for reading optical gratings on a record medium like a credit card. The reader includes a grating plane located within the reader, a radiant energy source means, and an optical imaging means for directing energy from said energy source means along an optical axis to said grating plane. The reader also includes transport means for providing relative movement between the optical gratings on the record medium in the grating plane and the optical axis. Detector means are also included to receive predetermined order diffracted beams from the optical gratings as the record medium is moved through the reader. The optical imaging means also includes means for directing a zero order beam which is displaced from the optical axis back to the grating plane to enable the resulting predetermined order diffracted beams diffracted from the optical gratings to be received at the detector means whenever the record medium is displaced slightly from the grating plane. The system also includes a record medium having superimposed optical gratings thereon for added security to prevent the unauthorized use or duplication thereof.

The reader of this invention is also capable of reading superimposed optical gratings on a record medium using a two-out-of-six encoding.

These advantages and others will become more readily understood from the following description and drawings.

BRIEF DESCRIPTION OF THE DRAWINGS

FIG. 8 is a diagrammatic view illustrating the relationship between a zero order reflected beam and a first order diffracted beam;

FIG. 9 is a diagrammatic view illustrating how a slight tilting of the optical gratings at a grating plane in a reader will result in a diffracted beam missing its associated photodector;

FIG. 10 is a diagrammatic view of a reader made according to the principles of this invention, showing the use of a concave lens means which reflects zero order reflected beams back to the optical gratings to enable the resulting diffracted beams to reach their associated photodetectors even though the optical gratings are tilted with respect to or out of the associated grating plane;

FIG. 11 is a diagrammatic view similar to FIG. 10 showing how the combined effects of tilting and displacement of the optical gratings relative to the grating plane can be accommodated by the reader of this invention;

FIG. 14 is a block diagram showing a circuit used with the reader.

DETAILED DESCRIPTION OF THE INVENTION

Figure 1:
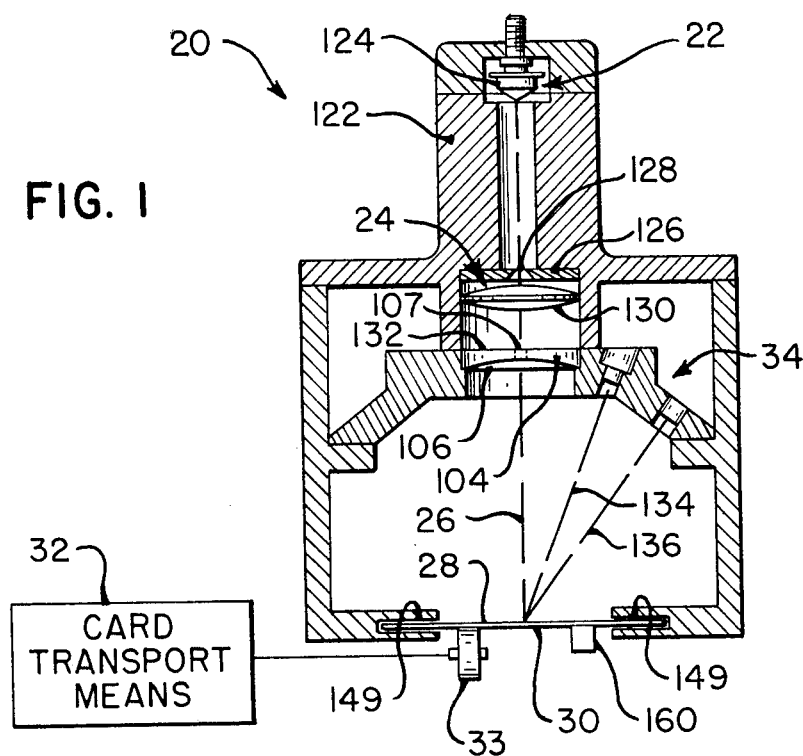
FIG. 1 is a side view, in elevation, of a reader made according to the principles of this invention, showing a light source means, a grating plane, optical imaging means, card transport means, and detector means.

A card reader which is made according to the principles of this invention is designated generally as 20 and is best shown in FIG. 1. The reader 20 includes a light source means 22, an optical imaging means 24 for directing light from said light source means 22 along an optical axis 26 to a grating plane 28 located in the reader. A record medium like a credit card 30 is moved through this reader (into the plane of the drawing as shown in FIG. 1) by a conventional card transport means 32 having a drive wheel 33 so that the coded optical gratings on the card 30 lie in a grating plane 28 as they are moved under the optical axis 26 by the card transport means 32. Detector means designated generally as 34 are positioned in the reader 20 to receive the diffracted light beams which are diffracted from the optical gratings on the credit card 30 being moved through the reader 20.

Before proceeding with a detailed discussion of the reader 20, it would be useful to discuss the construction of the credit card 30 with the optical gratings thereon, and the general optical principles which are employed in the reader 20.

Figure 3:
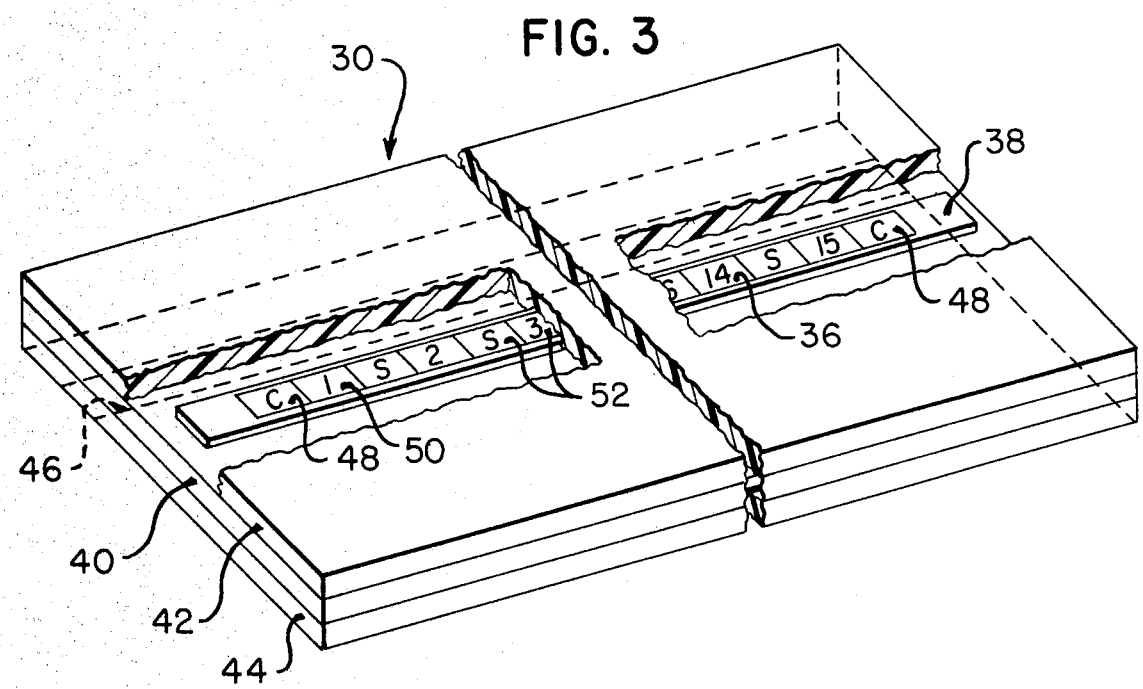
FIG. 3 is an enlarged, perspective view of a credit card having first data thereon in the form of optical or diffraction gratings and second data thereon in the form of a magnetic recording.

FIG. 3 shows the credit card 30 having the optical gratings designated generally as 36 to form first data thereon. The optical gratings 36 are formed on a strip of aluminized plastic 38, and the strip 38 is positioned on a body portion 40 of the card 30 and protected by a layer 42 of transparent plastic which is sealed to the body portion 40 to make the optical gratings tamper-proof. Another layer 44 of clear plastic is secured to the other side of body portion 40 to protect the printing which generally appears on both sides of the body portion 40. A magnetic stripe or track 46 may also be positioned on the card to record second data on the card 30. During the reading of the card, the first and second data on the card 30 may be compared to determine the validity of the card being used in a system like a cash dispensing machine as was disclosed in said copending application Ser. No. 588,937 mentioned earlier herein.

Figure 4:
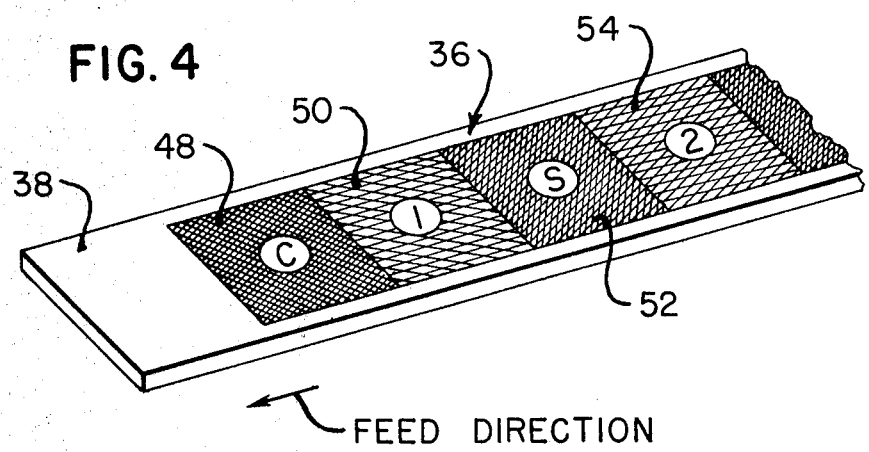
FIG. 4 is an enlarged, perspective view of a strip of reflective plastic material having the diffraction gratings thereon and used in the credit card shown in FIG. 1.
Figures 12, 13:
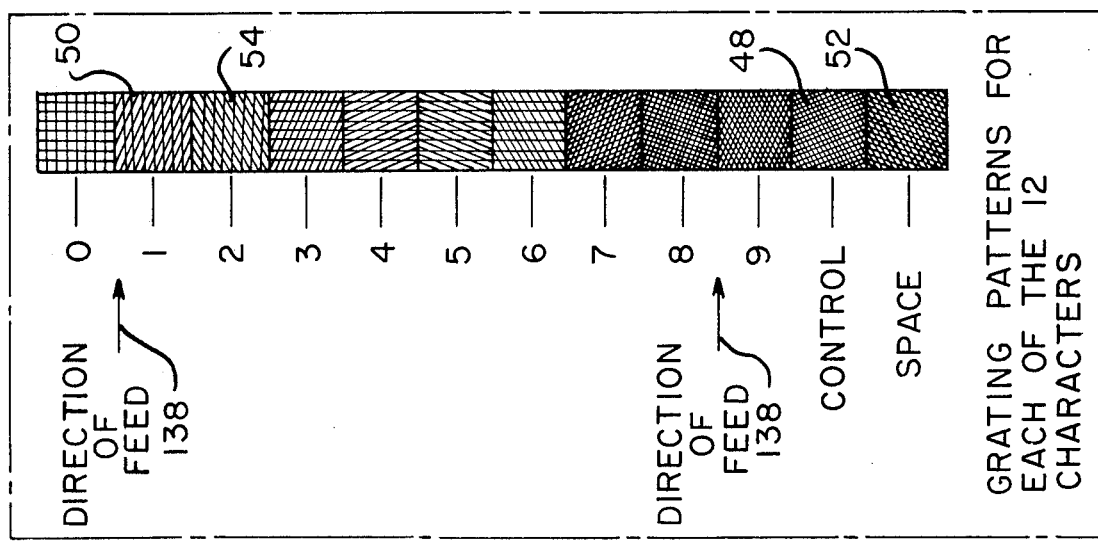
FIG. 12 is a chart showing a particular coding arrangement used in the credit card shown in FIG. 1.
FIG. 13 is a chart showing the grating patterns used in the coding arrangements shown in FIG. 12.

FIG. 4 shows an enlarged view of a portion of the optical gratings 36 shown in FIG. 3. In the embodiment shown, each optical grating like 48, 50, 52, 54 is formed in an area approximately one-tenth of an inch on a side, and each such grating is composed of two gratings with one being superimposed on the other. The particular grating pattern for coding the characters used on the strip 38 is best shown in FIG. 13 and will be described later herein.

For the moment, it is sufficient to state that the first data or optical gratings 36 consists of a control grating 48 (also marked as an encircled c) appearing at the start and end of the data, and character data like gratings 50 and 54, with successive characters being separated by a space grating 52 (also marked as an encircled S). It is these optical gratings 36 which are read by the reader 20 shown in FIG. 1.

Figure 5:
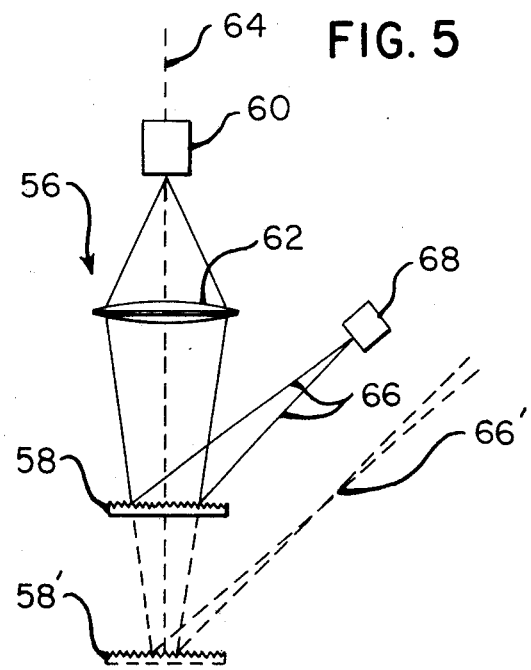
FIG. 5 is a diagrammatic view of a simple, optical grating reader showing how the diffracted rays can miss the associated detector if the diffraction grating being read is moved out of the grating plane along the direction of the associated optical axis.

FIG. 5 is a diagrammatic view of a simple optical reader 56 for reading a diffraction grating 58 located at the grating plane of the reader. In the usual operation, light from a light source 60 passes through a lens means 62 along the optical axis 64 of the reader 56 and is converged on the grating 58. Diffracted rays 66 from the grating 58 impinge upon a photodetector 68 positioned in the reader 56 to receive first order diffracted rays, for examle. In a simple system as is shown in FIG. 5, it is necessary that the optical gratings (like 58) being read be located in the grating plane in order for the diffracted rays to reach the associated detector 68. If, for example, the optical grating 58 is displaced from the grating plane along the optical axis 64 to the position shown in dashed outline as at 58', the resulting diffracted rays 66' will miss the associated detector 68, resulting in a loss of reading. Thus a simple reader, like reader 56, must have the grating position accurately controlled if it is to read accurately.

Figure 6:
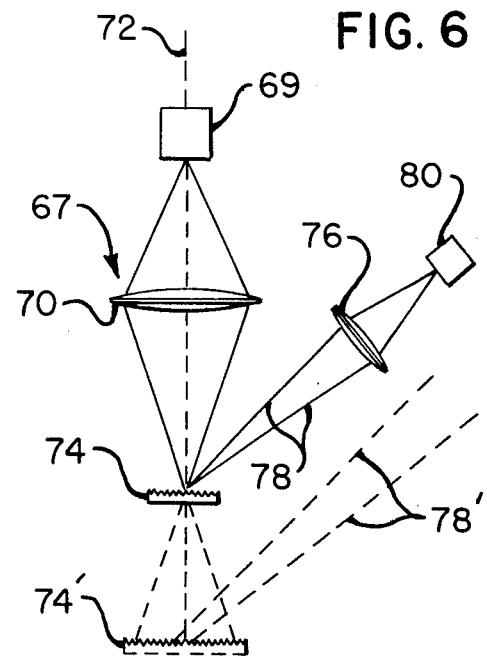
FIG. 6 is a diagrammatic view of a reader showing the use of an optical imaging system which maximizes the light level reaching the associated photodetector.

FIG. 6 discloses a reader 67 which is substantially the same as reader 56 shown in FIG. 5 except for some differences in the optical imaging system thereof. The reader 67 includes a light source (like a light emitting diode) whose output passes through a lens means 70 along an optical axis 72 of the reader 67 and is focused or concentrated at a point or small circle on the diffraction grating 74 located at the grating plane of the reader 67. A second lens means 76 concentrates diffracted rays 78, diffracted from the grating 74 on to a detector 80. When the grating 74 is displaced out of the grating plane along the optical axis 72 to the position shown in dashed outline 74', the diffracted rays 78' will miss the detector 80, resulting in a loss of reading.

Figure 7:
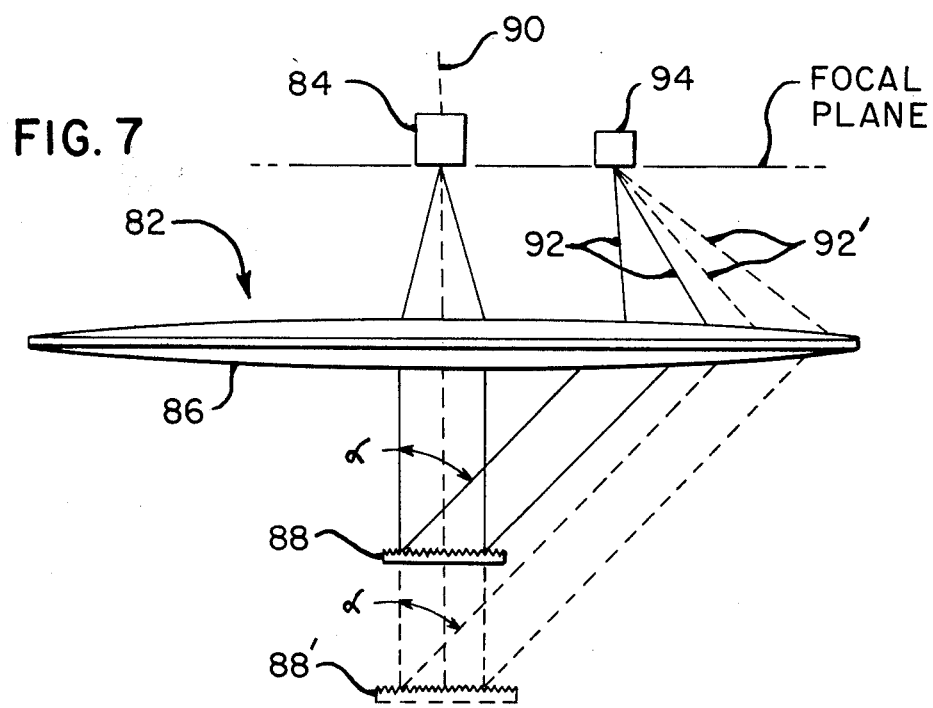
FIG. 7 is a diagrammatic view of a reader showing a large collimating lens being used for the purpose of enabling the reader to read optical gratings even though the gratings are moved out of the associated grating plane.

FIG. 7 discloses a simple optical grating reader 82 which provides for some flexibility in reading an optical grating when it is displaced slightly from the grating plane of the reader 82. The reader 82 includes a light source 84 whose light is collimated by a large diameter collimating lens 86 which directs the light to an optical grating 88 located along the optical axis 90 in the grating plane of the reader. The resulting diffracted beams 92 which are still collimated are diffracted from the grating 88 at an angle $\alpha$ and are focused on a detector 94. The position of an image within the focal plane of a given collimating lens 86 is determined primarily by the angular direction of the diffracted beam and is relatively independent of where the beam strikes the lens 86. Accordingly, a displacement of the optical grating 88 along the optical axis 90 to the position shown in dashed outline 88' results in the diffracted rays 92' being diffracted at the same angle $\alpha$, striking the lens 86, and being focused on the detector 94. One limitation in the amount of displacement from the grating plane along the optical axis 90 that can be tolerated by the reader 82 is determined by the diameter of the lens 86 over which the diffracted beam 92, 92' can move without missing the lens 86.

In the readers 56, 67 and 82 described in relation to FIGS. 5, 6 and 7 respectively, it is also necessary that the associated optical gratings 58, 74 and 88 lie in grating planes which are perpendicular to the optical axes of the respective readers. As shown in FIG. 8, if an input light beam I is perpendicular to an optical grating 96, the resulting zero order beam 98 is reflected back along the optical axis I, and a first order diffracted beam 100 is diffracted at an angle $\alpha$ with respect to the zero order beam 98, according to known optical principles, to reach a detector 102. If the optical grating 96' is tilted at an angle of $\phi$ as shown in FIG. 9, the zero order beam 98' is displaced from the optical axis I by an angle of $2\phi$, and the first order diffracted beam 100' is displaced to an angle of $(\alpha + 2\phi)$. If the grating 96' is tilted at an angle of $\phi$ of approximately 0.7°, it is generally sufficient to cause the first order beam 100' to miss the associated detector 102.

FIG. 10 is a diagrammatic view of a portion of the reader 20 shown in FIG. 1 and is used to illustrate the principles of this invention. Part of the imaging means 24 of reader 20 includes a lens 104 having a mirrored, spherical, concave surface 106 thereon. The surface 106 of lens 104 has a radius R whose center of curvature intersects the optical axis 26 at the grating plane 28 of the reader 20. The lens 104 also has an aperture 107 which is located therein at the optical axis 26 of the reader 20. When an optical grating like 108 is positioned in the grating plane 28 of the reader 20, an input beam I (FIG. 10) is diffracted at an angle $\alpha$ to reach an associated detector 110 as was described in relation to FIG. 8, and the zero order beam will be reflected along the optical axis 26 towards the light source means 22 (FIG. 1). If, however, the grating 108 is tilted at an angle $\phi$ as shown in FIG. 10, the zero order beam designated 0 will travel along the radius R and will arrive at the curved surface 106 and the resulting first order beam D will move to the angle represented by $(2\phi + \alpha)$ and the beam D will miss the associated detector 110 as was described in relation to FIG. 9. Because the zero order beam 0 arrives at the curved surface 106 perpendicular thereto, a reflected beam 112 will travel along the radius R to the grating 108. The beam 112 now acts as an incident beam to the grating 108, and it will generate a zero order beam 0' and a first order diffracted beam D' at an angle of $\alpha_1$ to the zero order beam 0'. Since the angle $\alpha$ equals $\alpha_1$, the first order diffracted beam D' will arrive at the associated detector 110 regardless of the tilt $\phi$ of the grating 108 as long as the reflected beam R hits the curved surface 106, ie. is within the distance $r$.

FIG. 11 is a diagrammatic view similar to FIG. 10, showing how the combined effects of tilting and displacement of an optical grating 108 at the grating plane can be accommodated by the reader 20. The effects of tilting the optical grating 108 at position A result in a first order beam D' arriving at the detector 110 as was described in relation to FIG. 10. When the optical grating 108' is tilted and also displaced along the optical axis 26 to the position shown at B, a zero order beam 114 will return to the curved mirror surface 106 and strike it at R' instead of R, so the beam 114 will not be at a right angle to the curved surface 106, and therefore the reflected beam 116 will return to the grating 108' along a different path compared to the zero order 0 described in relation to FIG. 10. The zero order beam 0' (also designated 118 in FIG. 11) will be shifted off the optical axis 26 and the resulting diffracted beam 120 will be diffracted at an angle $\alpha_2$ with respect to the zero order beam 0' (118) and will reach the detector 110. The angle $\alpha_2$ is slightly different from the angle $\alpha$ also shown in FIG. 11 due to the displacement along the optical axis 26; however, the difference will normally be less than 1°, and will not interfere with the corrective process described herein. In a typical arrangement having a lens 104 whose radius of curvature R is 2 inches, and with an optical grating 108 having a grating frequency or line pitch of 350 lines per mm, the grating 108' may be displaced ±0.1 inch from the normal grating plane and may have a tilt angle $\phi$ of 4° as worst case conditions and still have the resulting diffracted beams like 120 be displaced only 0.055 inches from the associated detector 110 to thereby enable a reading. The detector 110 may be provided with a sufficiently large active area to allow for the small displacement of beam 120, or a lens similar to lens 76 of FIG. 6 may be positioned between the grating 108' and the detector 110 to focus the beam 120 on the detector 110.

The basic optical principles described in relation to FIGS. 5 through 11 are utilized in the reader 20 shown in FIG. 1. The reader 20 includes a light-proof, cylindrically-shaped housing 122 which is conventionally made in cylindrical sections to facilitate its assembly and the installation of the elements housed therein.

The light source means 22 (FIG. 1) includes a light emitting diode 124 which brightly illuminates a spot of 0.030 inch diameter on the grating plane 28.

The selection of the light emitting diode 124 (FIG. 1) used in the reader 20 is an important part of the reader 20 because of the need to illuminate a small spot of the optical or diffraction gratings 36 on the credit card 30 as brightly as possible. Because the imaging means 24 of the reader 20 is of the one-to-one variety, changing the imaging system so that an enlarged-area-light-emitting diode will be focused on the 0.030 inch diameter spot on the gratings 36 will not increase the illumination, as is well-known in optical design. Consequently, the light emitting diode 124, itself, must provide a maximum amount of energy from an area having a diameter of less than 0.030 inch.

The light emitting diode 124 selected for use in the reader 20 is numbered T1XL-27 and is manufactured by Texas Instruments Corp. This diode 124 operates in the infra-red range, having a radiation wavelength centered about 940 nanometers, and is rated at 15 milliwatt output from a square radiating area having a 0.016 inch side. The diode 124 is operated in a pulse mode, raising the peak power to a maximum of 90 milliwatt; requiring an input current pulse of 4 amps and a duty cycle of under 10%. The diode 124 performed well then pulsed with a current of 3 amps, for 10 microseconds on with a 10 KHz repetition rate.

The optical imaging means 24 (FIG. 1) includes an opaque plate 126 having a small opening 128 of 0.140 inch diameter located along the optical axis 26 of the reader 20, and a condenser lens 130 as shown. The lens 130 focuses the image of the LED 124 on to the grating plane 28 through the opening 107 in the mirror surface 106 of the lens 104 already described in relation to FIGS. 10 and 11. The diameter of opening 107 is 0.1 inch, and this opening establishes the size of the cone of illumination falling on the grating plane 28 and also the cone of light falling on the individual detectors of the detector means 34. Detector illumination level is proportional to the size of the opening 107 until the detector (like 110 in FIG. 11) is completely illuminated. Any increase in the opening 107 beyond that point will decrease the effective separation between detectors of the detector means 34, thereby reducing selectivity. As previously stated, the radius of curvature R (as shown in FIGS. 10 and 11) of lens 104 is approximately two inches in the embodiment shown, and the curved surface 106 of the lens 104 is spaced this distance from the grating plane 28. The lens 104 has a plane back surface 132, a focal length of minus 10 cm., a diameter of 22.4 mm, a center thickness of 1.55 mm, and an edge thickness of 2.67 mm.

Figure 2:
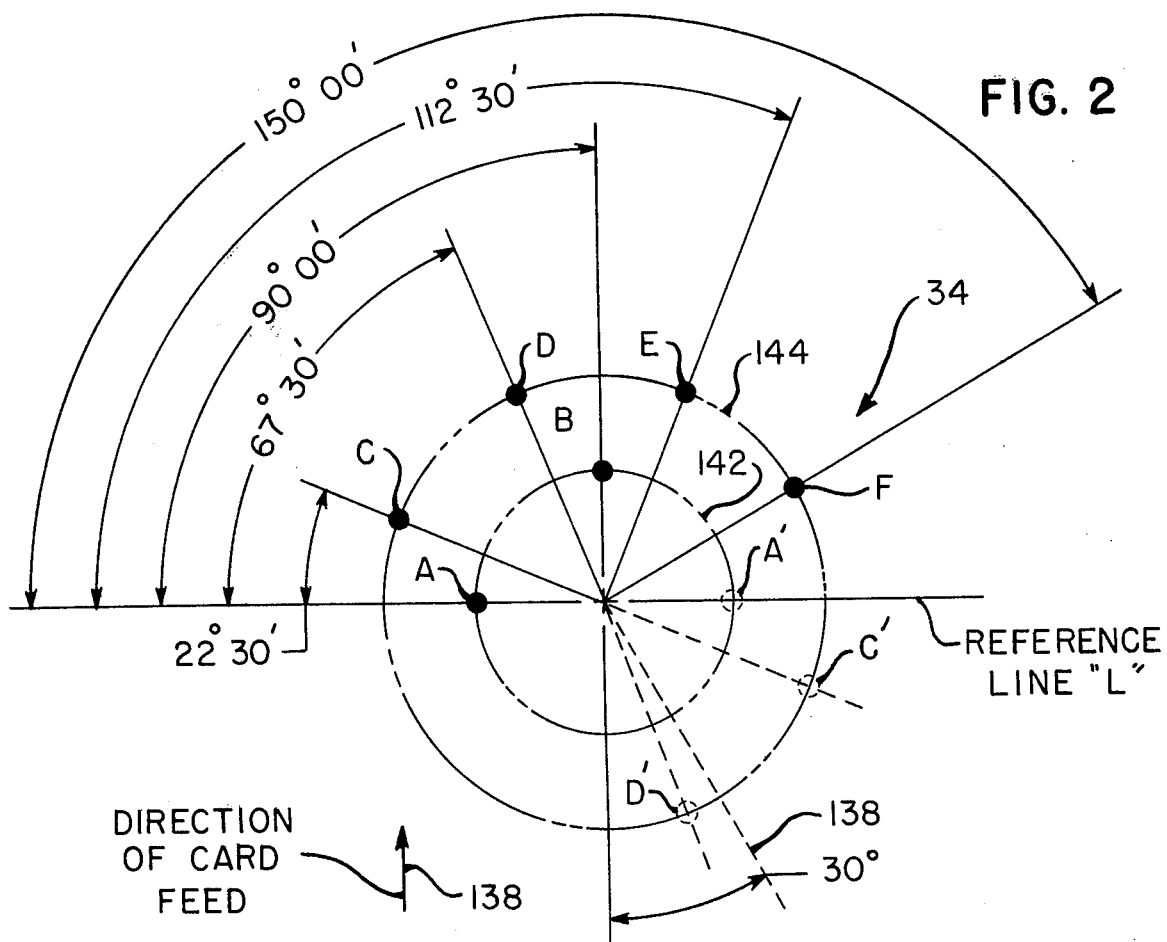
FIG. 2 is an enlarged diagrammatic view showing the positioning of the detector means in the reader.

The detector means 34 (FIG. 1) include six individual detectors lettered A, B, C, D, E and F (FIG. 2). The function of each of the detectors A, B etc., is to detect the presence of light falling on its specific location in the reader 20 as a result of a specific grating like 48, 50, 36 (FIG. 3) being located at the grating plane 28 and optical axis 26 of the reader. Each detector A, B etc., functions as a binary switch, ideally ignoring stray light or electronic noise, and clearly indicating the presence or absence of the associated diffracted light beam like 134, 136.

The particular type of detector selected for use in the reader 20 was a photodiode type PIN-3D which is manufactured by United Detector Technology, Inc. The detectors A, B etc. each have an active area of 0.050 × 0.100 inch and are sensitive to a wavelength of light of approximately 940 nanometers and are compatible with the 10 microsecond pulse and 10 KHz repetition rate of the LED 124.

The detectors A, B etc. are arranged in one embodiment of the reader 20 as shown in FIG 2 to read a binary, two-out-of-six code which is encoded as shown in FIG. 12. The optical or diffraction gratings 36 shown in FIGS. 3 and 4 are composed of two diffraction gratings for each of the 12 "character" designations shown in FIG. 12. In the embodiment shown, one grating has a line pitch of 350 lines per mm. and the other grating has a line pitch of 600 lines per mm., and each of the gratings is formed on the strip 36 in the combinations and at the angular positions shown in FIG. 13. The character 2, for example, is formed by a 350 lines per mm. grating whose parallel lines are positioned parallel to the direction of card feed 138 or are positioned at 90° relative to the Reference Line L shown in FIG. 2, and a 600 lines per mm. grating positioned at 30° relative to the direction of feed 138 (FIG. 2) or 240° as measured from the Reference Line L shown in FIG. 2. From the chart shown in FIG. 12, it is apparent that a character 2 is detected by energizing the detectors A and F which are positioned in the reader 20 as shown by the angular locations of the detectors in FIG. 2, so as to receive the first order diffracted beams (like 134, 136 shown in FIG. 1) from their associated gratings located on a card 30 being read. Similarly, the control grating C (also numbered 48 in FIGS. 3 and 4) is read when the detectors D and F are energized by their associated diffraction gratings on the credit card 30.

FIG. 13 shows a greatly enlarged view of the grating patterns for each of ten numerics 0 to 9, the control gratings 48, and the space gratings 52. As a general rule, the beams which are diffracted from a diffraction grating are diffracted in directions which are at right angles to the parallel lines of the grating itself. From what has already been described, the angular positions of the diffraction gratings shown in FIG. 13 can be readily determined so as to be detected by the photodetectors A, B etc., positioned in the reader 20 according to the angular locations shown in FIGS. 2 and 12. The angular positions of the gratings shown in FIG. 13 are positioned with reference to the direction of feed (shown by line 138), and this is the direction in which the gratings 36 are fed in the reader 20, ie. into the plane of the drawing as shown in FIG. 1.

From what has been described relative to FIG. 2, it is apparent that the photodetectors A, B etc., are located on both sides of the direction of card feed 138 shown therein. In some situations, it may be advantageous to have all the photodetectors located on one side of the line represented by the direction of feed shown in FIG. 2. This may be accomplished by moving the detectors A, C and D to their 180° counterparts to locate them in the positions shown in dashed outline at A', C' and D' respectively. It should be noted that detectors A and B which respond to a grating having a line pitch of 350 lines per mm. are located on a first circle having a diameter 142, and the detectors C, D, E and F which respond to a grating having a line pitch of 600 lines per mm. are located on a second circle having a diameter 144 which is larger than the diameter 142 in accordance with known diffraction grating principles.

The location of the detectors A, B, C, D, E and F shown in FIG. 2, and the particular associated grating patterns shown in FIG. 13 were the result of a considerable amount of experimentation to determine the best combination of diffraction grating patterns and detector locations so as to minimize interfering or cross product diffraction beams (causing erroneous readings) and yet provide for accurate reading of the gratings 36 on the card 30 when the card 30 was tilted up to about 4° out of the grating plane 28 of the reader 20 and displaced about ±0.1 inch from the grating plane 28 along the optical axis 26 of the reader 20. First order diffracted beams were utilized in the reader 20; however, other predetermined order diffraction beams could be utilized following the principles of this invention.

FIG. 14 is a block diagram of a circuit used with the reader 20, and includes a conventional control means 146 and an LED pulse driver 148 whose output is used to pulse the light emitting diode 124 as previously explained. As the card 30 with the gratings 36 thereon is moved through facing opposed slots 149 in the reader 20 by the card transport means 32 to position the card 30 in the grating plane 28, the diffracted beams like 134, 136 in FIG. 1, fall upon their associated detectors A, B etc., of the detector means 34 as previously explained. Each photodetector A through F in FIG. 14 has its output connected to a conventional preamplifier 150, which is a low noise, general purpose amplifier, and the output of the preamplifier 150 is connected to a thresholding amplifier 152 which is a conventional threshold detector/driver which converts the signals from the photodetectors to binary signals which are compatible with standard TTL logic circuits. A gate signal is fed over line 154 to each of the thresholding amplifiers 152 to enable a reading to be taken during the times that the diode 124 is being pulsed as previously explained to eliminate stray or erroneous readings. The outputs 156 from each of the thresholding amplifiers 152 are fed to a utilization device 158 like a cash dispensing machine or other systems which utilizes the readings from the credit card 30. A separate magnetic read head 160 (FIG. 1) reads the magnetic track 46 on the card 30 and the desired portion of its output may be compared in the utilization device 158 with the data obtained from the optical grating 36 to provide a security check on the card 30 being read as described in said copending application, Ser. No. 588,937.

The superimposed gratings 36 on the strip 38 (FIG. 4) are formed on the side of the strip containing a relfective aluminum layer thereon. The superimposed gratings 36 may be formed on the strip by a conventional embossing technique. Simple grating masters from which the gratings are produced may be made by conventional techniques, or the masters may be produced by the techniques described in copending application Ser. No. 611,377 filed by Messrs. William R. Horst, James L. McNaughton and Charles F. Mort on the same date as this application and assigned to the same assignee to whom this application is assigned.

What is claimed is:

1. A reader for reading optical gratings on a record medium comprising:
    a frame means for guiding a record medium with said optical gratings thereon in a grating plane in said reader;
    light source means;
    optical imaging means for directing light from said light source means along an optical axis which is perpendicular to said grating plane;
    transport means for providing relative movement between said optical gratings of said record medium and said optical axis in said grating plane;
    detector means positioned in said frame means to receive predetermined order diffracted beams from the optical gratings on a record medium moving in said grating plane relative to said optical axis; and
    said optical imaging means including means for directing a zero order beam which is reflected from said optical gratings and which is displaced from said optical axis back to said grating plane to enable the resulting predetermined order diffracted beams diffracted from said optical gratings to be received at said detector means whenever a record medium is displaced slightly from said grating plane;
    said means for directing said zero order beam including a spherically shaped mirrored surface whose center of curvature lies along said optical axis and also lies in said grating plane; said surface having an aperture located at said optical axis.

2. The reader as claimed in claim 1 in which said detector means includes a plurality of discrete photodetectors positioned therein to receive first order diffraction beams from said optical gratings positioned at said grating plane, and said light source means emits infra red radiation.

3. A reader for reading superimposed reflective optical gratings on a record medium comprising:
    a frame means for guiding a record medium with said optical gratings thereon in a grating plane in said reader;
    light source means;
    optical imaging means for directing light from said light source means to said optical gratings along an optical axis which is perpendicular to said grating plane;
    transport means for moving said record medium in said grating plane;
    detector means positioned in said frame means to receive first order diffracted beams from said superimposed optical gratings;
    said optical imaging means including means for directing a zero order beam which is reflected from said optical gratings and which is displaced from said optical axis back to said grating plane to enable the resulting first order diffracted beams diffracted from said optical gratings to be received at said detector means whenever a record medium is displaced slightly from said grating plane;
    said means for directing said zero order beam including a spherically shaped mirrored surface whose center of curvature lies along said optical axis and also lies in said grating plane; said surface having an aperture located at said optical axis.

4. The reader as claimed in claim 3 in which said detector means includes a plurality of discrete photodetectors positioned therein to receive said diffracted beams.

5. The reader as claimed in claim 4 in which said photodetectors are positioned in said reader to detect said superimposed gratings which have their line pitch and angular orientation varied in accordance with a predetermined encoding.

6. The reader as claimed in claim 5 in which said light source means includes an infra red, light-emitting diode and said photodetectors are located within an included angle of 180° and are responsive to said infra-red, light-emitting diode.

7. The reader as claimed in claim 5 in which first and second ones of said photodetectors are located on a first circle at 0° and 90° respectively from a reference line to receive first order diffracted beams from a first optical grating having a line pitch of 350 lines per millimeter, and in which third, fourth, fifth and sixth ones of said photodetectors are located on a second circle at 22° 30 mins., 67° 30 min., 112° 30 mins. and 150° respectively from said reference line to receive first order diffracted beams from a second optical grating having a line pitch of 600 lines per millimeter.

8. An optical identification system comprising:
a reading means; and
a record medium having a plurality of superimposed reflective optical gratings thereon corresponding to a selected code;
said reading means comprising:
a grating plane associated with said reader;
radiant energy source means;
imaging means for directing energy from said radiant energy source means along an optical axis to said grating plane;
means for providing relative movement between said superimposed optical gratings on said record medium and said optical axis in said grating plane;
detector means associated with said reading means to receive predetermined order diffracted beams from said superimposed optical gratings and for converting the diffracted beams into electrical signals corresponding to said selected code;
said detector means including a plurality of discrete photodetectors positioned in said reading means to receive first order diffraction beams from said optical gratings positioned at said grating plane;
said superimposed gratings having their line pitch and angular orientation varied in accordance with a two out of six encoding;
said radiant energy source means including an infra-red, light-emitting diode and said photodetectors being located within an included angle of 180 degrees.

9. An optical identification system comprising:
a reading means; and
a record medium having a plurality of superimposed relfective optical gratings thereon corresponding to a selected code;
said reading means comprising:
a grating plane associated with said reader;
radiant energy source means;
imaging means for directing energy from said radiant energy source means along an optical axis to said grating plane;
means for providing relative movement between said superimposed optical gratings on said record medium and said optical axis in said grating plane;
detector means associated with said reading means to receive predetermined order diffracted beams from said superimposed optical gratings and for converting the diffracted beams into electrical signals corresponding to said selected code;
said superimposed gratings having their line pitch and angular orientation varied in accordance with a two out of six encoding;
said detector means including a plurality of discrete photodetectors positioned in said reading means to receive first order diffraction beams from said optical gratings positioned at said grating plane, in which first and second ones of said photodetectors are located on a first circle at 0° and 90° respectively from a reference line to receive first order diffracted beams from a first optical grating having a line pitch of 350 lines per millimeter, and in which third, fourth, fifth and sixth ones of said photodetectors are located on a second circle at 22° 30 mins., 67° 30 mins., 112° 30 mins., and 150°, respectively from said reference line to receive first order diffracted beams from a second optical grating having a line pitch of 600 lines per millimeter.

10. The system as claimed in claim 9 in which said imaging means includes means for directing a zero order beam which is reflected from said optical gratings and which is displaced from said optical axis back to said grating plane to enable the resulting first order diffracted beams diffracted from said optical gratings to be received at said first, second, third, fourth, fifth and sixth ones of said photodetectors whenever a record medium is displaced slightly from said grating plane.

11. An optical identification system comprising:
a reading means; and
a record medium having a plurality of superimposed reflective optical gratings thereon corresponding to a selected code;
said reading means comprising:
a frame means for guiding said record medium with said optical gratings thereon in a grating plane therein;
light source means;
optical imaging means for directing light from said light source means along an optical axis to said optical gratings at said grating plane;
transport means for moving said record medium in said grating plane;
detector means positioned in said frame means to receive predetermined order diffracted beams from said superimposed optical gratings and for converting the diffracted beams into electrical signals corresponding to said selected code;
said optical imaging means including means for directing a zero order beam which is displaced from said optical axis back to said grating plane to enable the resulting predetermined order diffracted beams diffracted from said optical gratings to be received at said detector means whenever a record medium is displaced slightly from said grating plane.

12. The system as claimed in claim 11 in which said means for directing said zero order beam includes a concave surface whose center of curvature lies along said optical axis and also lies in said grating plane.

13. The system as claimed in claim 12 in which said concave surface is spherical and mirrored and has an aperture located at said optical axis; and in which said optical axis is perpendicular to said grating plane.

14. The system as claimed in claim 11 in which said detector means includes a plurality of discrete photodetectors positioned therein to receive said diffracted beams from said superimposed diffraction gratings on said record medium, and said light source means emits infra-red light.

* * * * *